United States Patent
van den Brink et al.

(10) Patent No.: US 11,394,897 B2
(45) Date of Patent: Jul. 19, 2022

(54) MIRROR REPLACEMENT SYSTEM WITH DYNAMIC STITCHING

(71) Applicant: Orlaco Products B.V., Barneveld (NL)

(72) Inventors: Alfred van den Brink, Barneveld (NL); Milan Gavrilovic, Upsalla (SE); Pontus Olsson, Stockholm (SE)

(73) Assignee: Orlaco Products B.V., Barneveld (NL)

( * ) Notice: Subject to any disclaimer, the term of this patent is extended or adjusted under 35 U.S.C. 154(b) by 122 days.

(21) Appl. No.: 16/794,538

(22) Filed: Feb. 19, 2020

(65) Prior Publication Data

US 2020/0267332 A1    Aug. 20, 2020

Related U.S. Application Data (60) Provisional application No. 62/807,352, filed on Feb. 19, 2019.

(51) Int. Cl.
| | |
|---|---|
| *H04N 5/262* | (2006.01) |
| *H04N 7/18* | (2006.01) |
| *B60R 1/00* | (2022.01) |
| *B60R 21/013* | (2006.01) |

(52) U.S. Cl.
CPC ............ *H04N 5/2628* (2013.01); *B60R 1/00* (2013.01); *B60R 21/013* (2013.01); *H04N 7/18* (2013.01); *B60R 2300/105* (2013.01); *B60R 2300/20* (2013.01); *B60R 2300/303* (2013.01)

(58) Field of Classification Search
CPC .... B60R 21/013; G06T 3/4038; H04N 5/262; H04N 5/23238; G06K 9/6202
See application file for complete search history.

(56) References Cited

U.S. PATENT DOCUMENTS

| | | |
|---|---|---|
| 6,611,202 B2 | 8/2003 | Schofield et al. |
| 7,466,338 B2 | 12/2008 | Xie |
| 7,859,565 B2 * | 12/2010 | Schofield .............. B60S 1/0822 348/148 |
| 8,004,394 B2 | 8/2011 | Englander |

(Continued)

OTHER PUBLICATIONS

_ Fast stitching algorithm for moving object detection and mosaic construction; Jun. 2003. (Year: 2003).*

(Continued)

*Primary Examiner* — Luis Perez-Fuentes
(74) *Attorney, Agent, or Firm* — Carlson, Gaskey & Olds, P.C.

(57) ABSTRACT

A camera mirror system for a vehicle includes a camera system having at least a first and second field of view of a scene. The first and second fields of view include a shared overlap area. At least one display is configured to display the first and second fields of view to provide a complete view of the scene comprising the first and second fields of view adjoining at a stitching interface corresponding to an intersection of the first and second fields of view in the overlap area. At least one object detector is configured to detect an object in the scene. A controller is in communication with the camera system, the at least one object detector, and the at least one display. The controller includes a stitching algorithm configured to evaluate the proximity of the object to the overlap area and adjust at least one of the first and second fields of view to move the stitching interface and ensure the object is depicted on the at least one display.

20 Claims, 6 Drawing Sheets

(56) References Cited

U.S. PATENT DOCUMENTS

| | | | |
|---|---|---|---|
| 8,134,594 B2* | 3/2012 | Nagamine | B60W 40/02 348/149 |
| 8,264,716 B2 | 9/2012 | Ola et al. | |
| 8,633,810 B2* | 1/2014 | Luo | B60R 11/04 340/436 |
| 8,823,796 B2 | 9/2014 | Shen et al. | |
| 8,953,011 B2 | 2/2015 | Lang et al. | |
| 9,071,752 B2* | 6/2015 | Kuo | H04N 5/23238 |
| 9,648,233 B2* | 5/2017 | Beers | G02B 27/143 |
| 9,667,922 B2 | 5/2017 | Lang et al. | |
| 10,194,097 B2* | 1/2019 | Abbas | H04N 5/265 |
| 10,259,390 B2 | 4/2019 | Zhang et al. | |
| 10,313,584 B2 | 6/2019 | Pan et al. | |
| 10,397,524 B1* | 8/2019 | Wu | H04N 7/181 |
| 10,469,753 B2 | 11/2019 | Yang et al. | |
| 10,909,703 B2* | 2/2021 | Shen | H04N 5/23238 |
| 10,967,790 B2* | 4/2021 | Gyori | B60R 1/00 |
| 2002/0167589 A1* | 11/2002 | Schofield | H04N 7/181 348/148 |
| 2003/0122930 A1* | 7/2003 | Schofield | H04N 7/181 348/148 |
| 2009/0051778 A1 | 2/2009 | Pan | |
| 2011/0115615 A1* | 5/2011 | Luo | H04N 13/239 340/436 |
| 2014/0114534 A1* | 4/2014 | Zhang | H04N 5/23238 701/42 |
| 2014/0247352 A1* | 9/2014 | Rathi | G06K 9/00798 348/148 |
| 2014/0247353 A1 | 9/2014 | Lang et al. | |
| 2016/0088280 A1 | 3/2016 | Sadi et al. | |
| 2017/0006219 A1* | 1/2017 | Adsumilli | G06K 9/46 |
| 2017/0006220 A1 | 1/2017 | Adsumilli et al. | |
| 2018/0015881 A1 | 1/2018 | Sweet | |
| 2018/0086271 A1 | 3/2018 | Kosugi et al. | |
| 2018/0174327 A1 | 6/2018 | Singh | |
| 2018/0205889 A1* | 7/2018 | Abbas | H04N 5/265 |
| 2018/0244199 A1* | 8/2018 | Gyori | G06T 3/4038 |
| 2019/0034752 A1 | 1/2019 | Lang et al. | |
| 2019/0126825 A1 | 5/2019 | Park et al. | |
| 2019/0143896 A1 | 5/2019 | Rathi et al. | |
| 2019/0161011 A1 | 5/2019 | Timoneda et al. | |
| 2019/0184900 A1 | 6/2019 | Lang et al. | |
| 2019/0253625 A1 | 8/2019 | Pan et al. | |
| 2019/0260970 A1 | 8/2019 | Lu et al. | |
| 2020/0267332 A1* | 8/2020 | van Den Brink | G06T 3/4038 |

OTHER PUBLICATIONS

_ Automatic panoramic image stitching using invariant features; Brown; 2007. (Year: 2007).*

_ External vision based remote parking system; Li—2018. (Year: 2018).*

_ Library USPTO query for NPL; 2022. (Year: 2022).*

International Search Report and Written Opinion for International Application No. PCT/EP2020/054406 dated May 4, 2020.

Hsieh, Jun-Wei, Fast Stitching Algorithm for Moving Object Direction and Mosaic Construction, Image and Vision Computing, vol. 22, No. 4, Apr. 1, 2004, pp. 291-306, XP055174902.

International Preliminary Report on Patentability for Application No. PCT/EP2020/054406 dated Sep. 2, 2021.

* cited by examiner

MIRROR REPLACEMENT SYSTEM WITH DYNAMIC STITCHING

CROSS-REFERENCE TO RELATED APPLICATION

This application claims priority to U.S. Provisional Patent Application No. 62/807,352 filed on Feb. 19, 2019.

BACKGROUND

This disclosure relates to a camera mirror system for use in vehicles such as off-highway construction equipment, commercial trucks and passenger vehicles. More particularly, the disclosure relates to a system and method of stitching multiple images together on one or more displays from multiple cameras to mitigate object distortion.

Since the proliferation of backup cameras on passenger vehicles, the use of cameras in vehicles has become more prevalent. A more recent feature on some vehicles is a "surround view" that modifies multiple camera images combined, or "stitched", into a single displayed picture on a video screen in the vehicle cabin. The intersections of the fields of view of the various cameras are fixed such that each camera always displays the same portion of the scene.

This "surround view" inherently has distortions at these intersections such that objects located at, or passing across, the intersections may not entirely appear on the display or may be distorted. That is, the way in which the views from the different cameras are stitched together may omit objects that are actually present, and may skew, stretch, or compress visible objects at the stitching, thus failing to provide a "complete view." This can lead to a driver who confuses the "surround view" with a "complete view" or otherwise misinterprets a distorted image causing the vehicle to collide with an object in the stitching portion of the image.

SUMMARY OF THE INVENTION

In one exemplary embodiment a camera mirror system for a vehicle includes a camera system having at least a first and second field of view of a scene, the first and second fields of view including a shared overlap area, at least one display configured to display the first and second fields of view to provide a complete view of the scene comprising the first and second fields of view adjoining at a stitching interface corresponding to an intersection of the first and second fields of view in the overlap area, at least one object detector configured to detect an object in the scene, and a controller in communication with the camera system, the at least one object detector, and the at least one display, wherein the controller includes a stitching algorithm configured to evaluate the proximity of the object to the overlap area and adjust at least one of the first and second fields of view to move the stitching interface and ensure the object is depicted on the at least one display.

In another example of the above described camera mirror system for a vehicle the object detector includes one of an image based detection system and a 3D space detection system.

In another example of any of the above described camera mirror systems for a vehicle the first and second fields of view correspond to distinct class views.

In another example of any of the above described camera mirror systems for a vehicle first and second fields of view each have a maximum field of view that provides the overlap area, and the controller is configured to reduce at least one of the first and second fields of view from its maximum field of view to provide the stitching interface.

In another example of any of the above described camera mirror systems for a vehicle at least one of the first and second field of view is distorted at the stitching interface.

In another example of any of the above described camera mirror systems for a vehicle the controller evaluates the proximity of the object to the stitching interface by at least one of determining whether the object is approaching the overlap area, the object is in the overlap area, and/or the object is exiting the overlap area.

In another example of any of the above described camera mirror systems for a vehicle the controller is configured to determine whether the object is human, and wherein the stitching algorithm is configured to give priority to a first classification of objects over a second classification of objects.

In another example of any of the above described camera mirror systems for a vehicle the first classification of objects is human objects, the second classification of objects is non-human objects, and wherein the classification of human objects includes humans and objects likely to include humans.

In another example of any of the above described camera mirror systems for a vehicle the first classification of objects is a nearest object to vehicle classification.

In another example of any of the above described camera mirror systems for a vehicle the at least one object detector is a 3D space object detector including at least one of the camera system, a radar sensor, a LIDAR sensor, an infrared sensor, and/or an ultrasonic sensor.

In another example of any of the above described camera mirror systems for a vehicle the at least one object detector is an image detection system configured to detect an object using a neural network detection.

In another example of any of the above described camera mirror systems for a vehicle the camera system includes at least a third field of view of the scene, wherein the third field of view includes a corresponding overlap area with at least one of the first field of view and the second field of view and wherein the stitching algorithm is configured to evaluate the proximity of the object to the corresponding overlap area and adjust at least one of the third field of view and the at least one of the first and second field of view and ensure that the object is depicted on the at least one display.

An exemplary method of displaying multiple vehicle camera views, including the steps of sensing first and second images respectively in first and second fields of view of a scene, the first and second fields of view have an overlap area with one another and stitching the first and second images using a stitching interface to create a third image, wherein the stitching interface is a position where at least one of the first and second fields of view to meet one another, detecting a proximity of an object in the scene to the stitching interface, dynamically adjusting the stitching interface such that the object does not cross the stitching interface, and displaying the third image.

In another example of the above described method of displaying multiple vehicle camera views the sensing step is performed using first and second cameras respectively providing the first and second fields of view each having a maximum field of view that provides the overlap area.

In another example of any of the above described methods of displaying multiple vehicle camera views the dynamically adjusting step includes using less than the maximum field of view of at least one of the first and second cameras for display.

In another example of any of the above described methods of displaying multiple vehicle camera views the dynamically adjusting step includes shifting the stitching interface away from the object in response to the object entering the overlap area.

In another example of any of the above described methods of displaying multiple vehicle camera views the dynamically adjusting step further includes snapping the stitching interface behind the object.

In another example of any of the above described methods of displaying multiple vehicle camera views the dynamically adjusting step further comprises the stitching interface following the object after snapping behind the object.

In another example of any of the above described methods of displaying multiple vehicle camera views the detecting step includes sensing the object using at least one of a camera including at least one of first and second camera respectively providing the first and second fields of view, a radar sensor, a LIDAR sensor, an infrared sensor, and/or an ultrasonic sensor.

In another example of any of the above described methods of displaying multiple vehicle camera views the detecting step includes evaluating the proximity of the object to the overlap area by determining whether the object is approaching the overlap area, in the overlap area, or exiting the overlap area.

In another example of any of the above described methods of displaying multiple vehicle camera views the detecting step includes determining a classification of the object, and the adjusting step includes prioritizing objects having a first classification over objects not having the first classification when dynamically adjusting the stitching interface.

In another example of any of the above described methods of displaying multiple vehicle camera views the detecting step includes detecting at least one of a proximity to the vehicle and a time to collision with the vehicle and the adjusting step includes prioritizing a closest object to the vehicle when dynamically adjusting the stitching interface.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
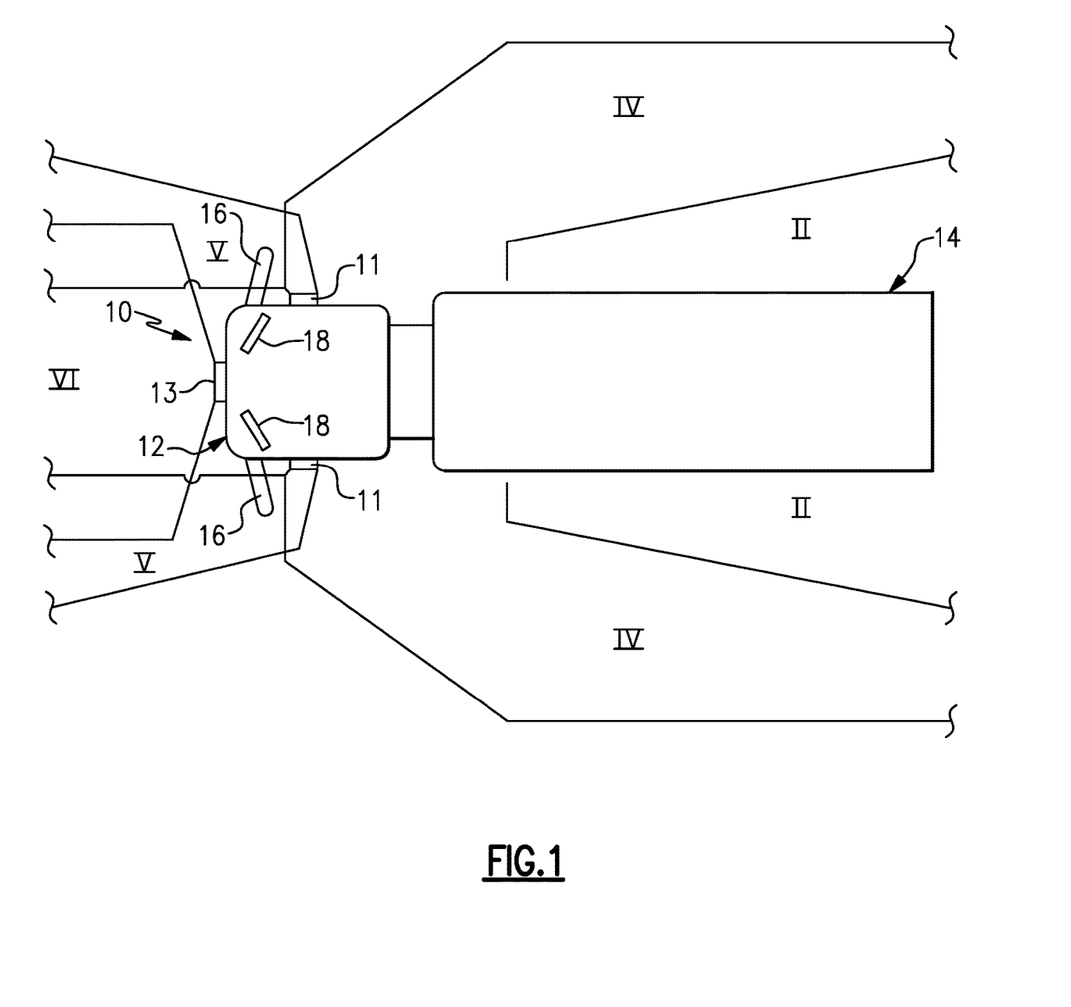
FIG. 1 is a schematic of a commercial truck with a camera mirror system for viewing multiple class views.

A schematic view of a commercial truck 10 is illustrated in FIG. 1. The truck 10 includes a vehicle cab 12 pulling a trailer 14. Driver and passenger side camera housings 16 are mounted to the vehicle cab 12. If desired, the camera housings may include conventional mirrors integrated with them as well. First and second displays 18 are arranged on each of the driver and passenger sides within the vehicle cab 12 to display class II and class IV views on each side of the vehicle 10. Fewer or more displays may be used than shown, including additional class displays, and the displays may be located differently than illustrated. In alternative examples, the stitching described herein can be utilized in combining images to form a surround view image using additional cameras 11 (providing class V views) and camera 13 (providing a class VI view). The illustrated camera positions are exemplary only, and practical implementations can include multiple additional cameras of any particular view type as may be needed by a given system.

Figure 2:
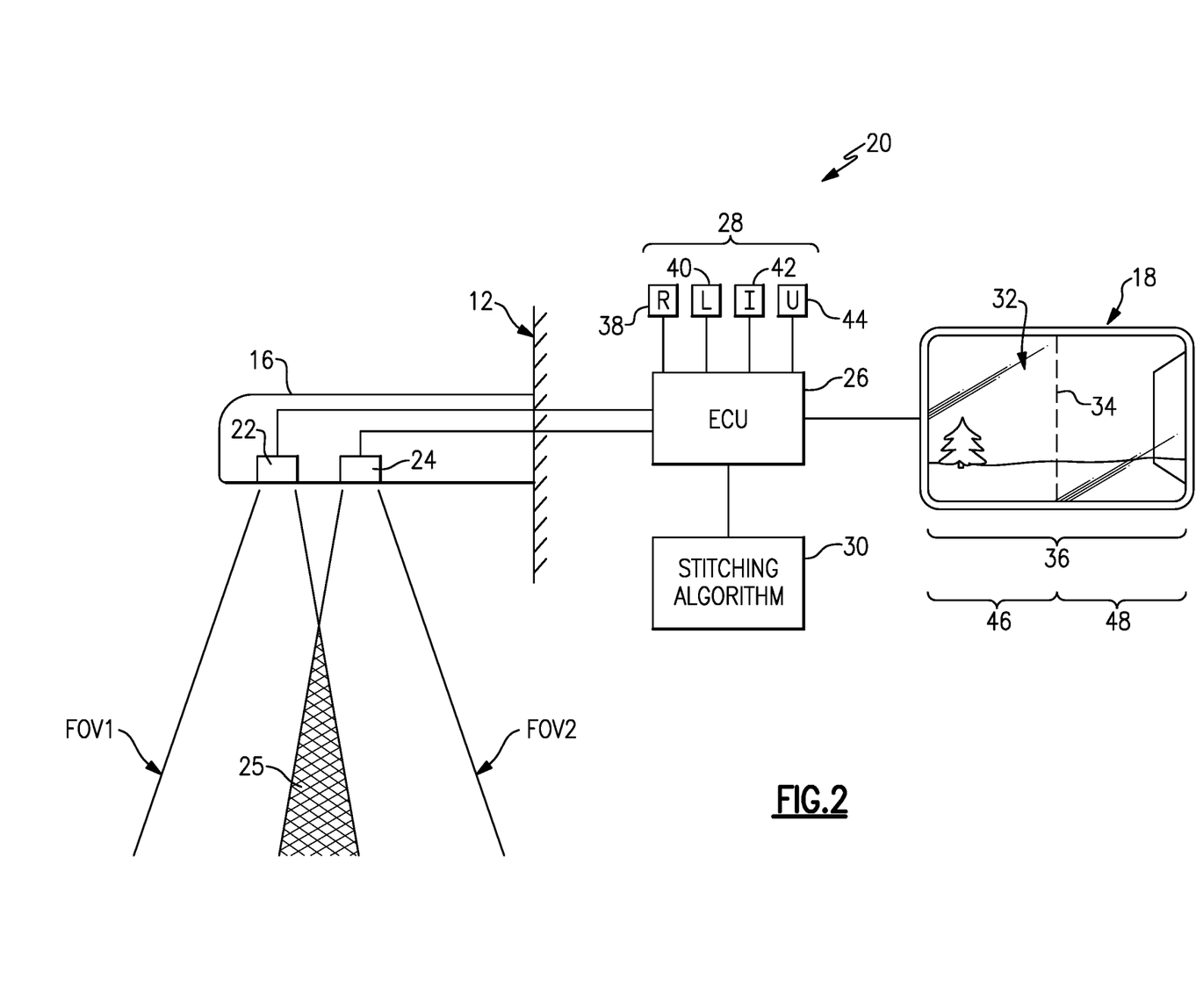
FIG. 2 is a schematic of the camera mirror system with a display that stitches images together from multiple cameras.

One example camera mirror system 20 is shown in a highly schematic fashion in FIG. 2. In one example, rearward facing first and second cameras 22, 24 are arranged within the camera housing 16. The first and second cameras 22, 24 provide first and second fields of view 22 FOV1, FOV2 that correspond to the class IV and class II views, for example. The first and second fields of view FOV1, FOV2 overlap with one another to provide an overlap area 25. It should be understood, however, that the cameras may be placed differently than illustrated and the fields of view provided may relate to other classes or other views entirely.

An ECU, or controller, 26 is in communication with the first and second cameras 22, 24. Various sensors 28, such as a radar sensor 38, a LIDAR sensor 40, an infrared sensor 42, and/or an ultrasonic sensor 44 may be in communication with the controller 26. The sensors 28 and/or first and second cameras 22, 24 are used to detect objects within the images captured by the first and second cameras 22, 24. Any number of suitable object detections schemes may be used, such as those that rely on neural networks and 3D geometry models to determine positions of objects in space, such as detection from ego-motion. In the case of object detection using a neural network, the first and second cameras 22, 24 provide at least one of the sensors used to detect the object. In alternative examples, any object detection system can be used to detect objects within an image plane, including image based detection such as neural networks analysis, as well as detecting images in 3D space using 3D space detection systems such as radar, lidar, sensors and the like.

The controller 26 outputs a video signal to be displayed 18. The video signal is a combination of the images from the first and second cameras 22, 24 based upon a stitching algorithm 30. In the example, a screen 32 of the display 18 provides a complete view 36 consisting of at least first and second adjusted fields of view 46, 48 from the first and second cameras 22, 24 that are joined at a stitching interface 34 (alternatively referred to as stitching). In operation, the stitching algorithm 30 is used to adjust at least one of the first and second fields of view FOV1, FOV2 to create an intersection in the overlap area 25. The intersection is selected to position objects outside of the intersection so the objects are not obscured or distorted, which could occur if a fixed intersection was used as in a typical surround view. In this manner, dynamic stitching of images is provided to the display 18, as the intersection and stitching interface is changed to account for the position of the object in relation to the overlap area 25. Even still, distortion of the object is unavoidable as the object crosses the stitching joining the images.

Figure 3A:
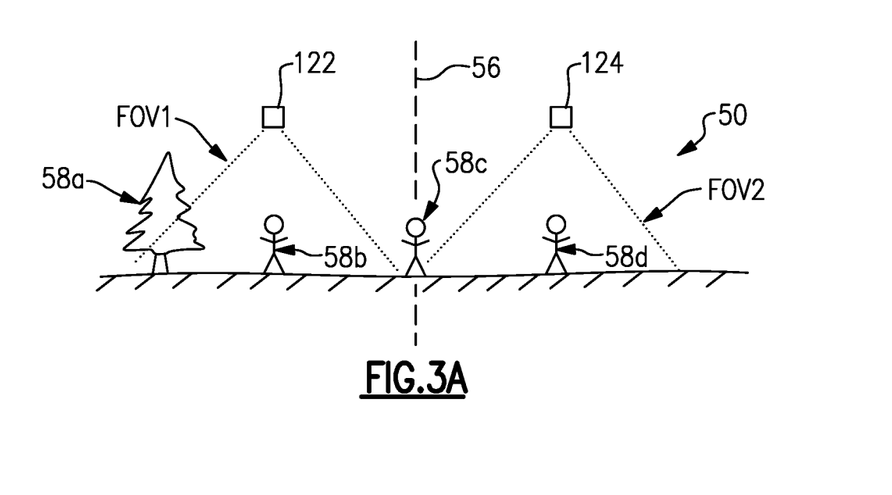
FIG. 3A illustrates a scene including multiple objects.

In contrast to the above, referring to FIG. 3A, the first and second fields of view FOV1, FOV2 from first and second cameras 122, 124 are illustrated for a typical surround view with a fixed intersection 56. The intersection 56 may be the point at which the maximum fields of view intersect with one another, or the intersection 56 may result from a video processing algorithm that determines the intersection of the image between the two cameras.

Figure 3B:
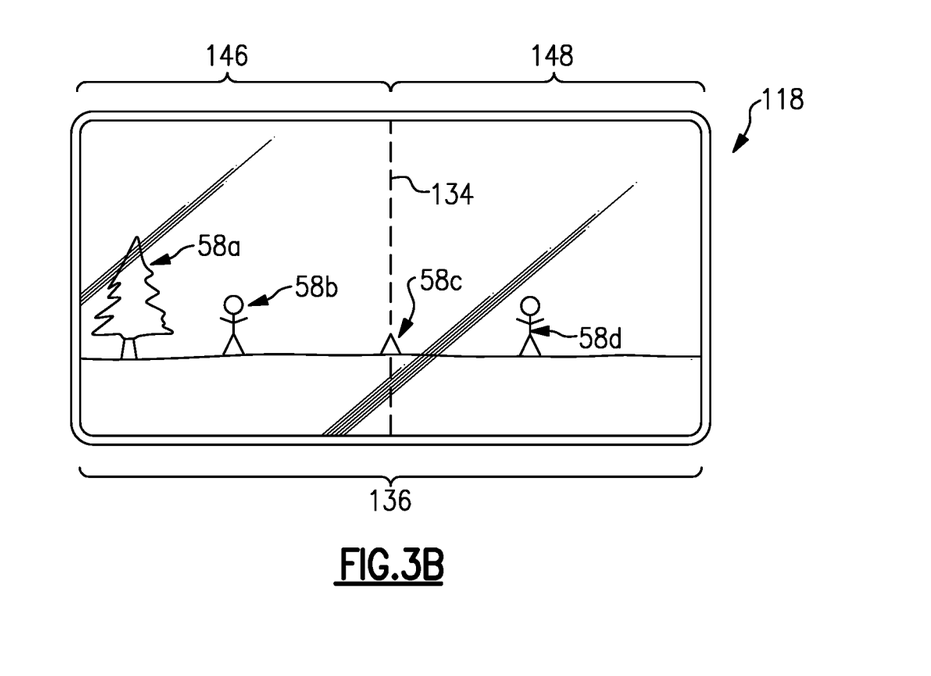
FIG. 3B is a display depicting the scene in FIG. 3A, which omits an object at an intersection of the camera fields of view due to the stitching interface on the display.

Various human and non-human objects 58*a*-58*d* are shown in a scene 50 covered by the first and second fields of view FOV1, FOV2. A display 118 corresponding to the scene 50 is illustrated in FIG. 3B. As can be appreciated, the object 58*c* located at the intersection 56 is positioned in an unpictured zone where the intersection 56 corresponds to the stitching interface 134 of the two images on the display 118. In such a "surround view" 136, objects may be lost. By way of contrast, the disclosed system and method moves the intersection and corresponding stitching interface dynamically based upon the position of a detected object in relation to the overlap area 25. By moving the position of the stitching dynamically in respond to the object approaching the stitching, the distortion of the object is minimized.

Figure 4:
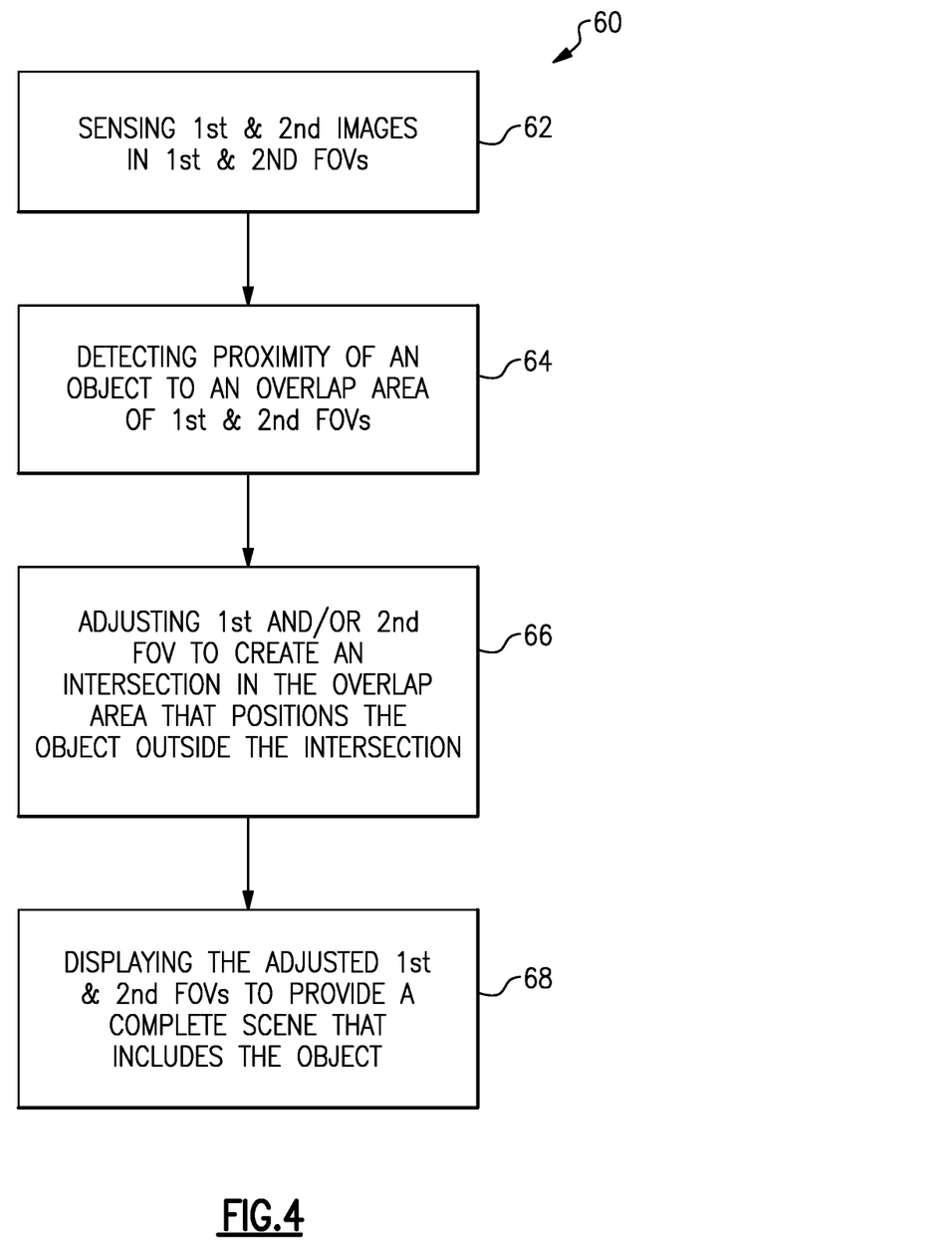
FIG. 4 depicts a method of providing a complete view from multiple camera fields of view.

Referring to FIG. 4, a method 60 of displaying multiple vehicle camera views is depicted. First and second images are sensed respectively in first and second fields of view FOV1, FOV2 of a scene by the first and second cameras 22, 24 (block 62). The first and second fields of view FOV1, FOV2 have an overlap area 25 with one another. A proximity is detected of an object 58 in the scene to the overlap area 25 (block 64).

At least one of the first and second fields of view FOV1, FOV2 is adjusted to meet one another at an intersection 56 in the overlap area 25 and position the object 58 outside the intersection 56 (block 66). These adjusted first and second fields of view are displayed to provide a complete scene 36 that includes the object 58 (block 68).

Figure 5:
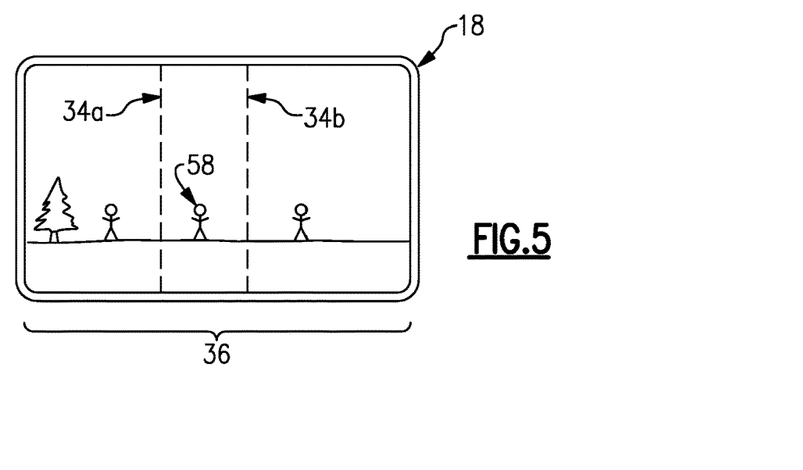
FIG. 5 is a display illustrating a complete view from multiple fields of view that have been stitched together.

The effects of this dynamic stitching method are shown in FIG. 5, where the stitching interfaces 34*a*, 34*b* are shown at different locations on the display 18 to provide a complete scene 36, thus providing a dynamic stitching image interface.

Figure 6A:
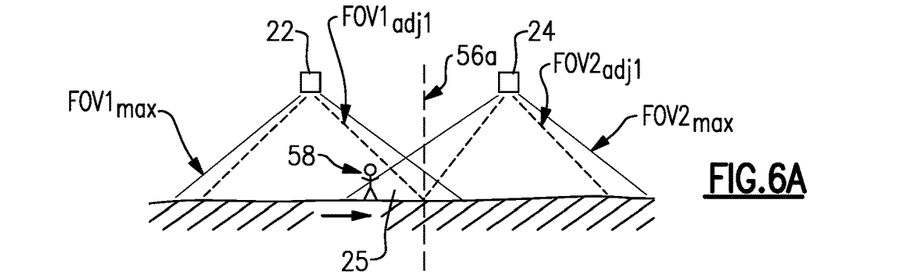
FIGS. 6A-6C illustrate adjusted first and second fields of view to accommodate an object in close proximity to or within an overlap area of the first and second fields of view.
Figure 6B:
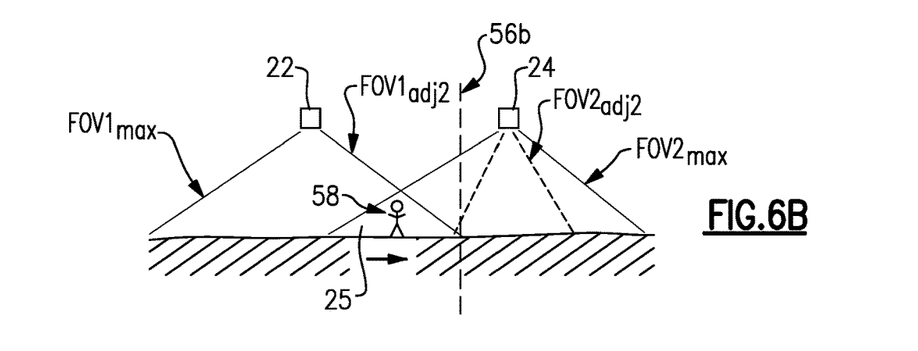

Referring to FIGS. 6A-6B, the sensors 28 are used to detect the objects within the scene. The stitching algorithm 30 determines the proximity of the object 58 in the scene in relation to the overlap area 25, which is where a blind spot might otherwise result. In one example, the controller 26 evaluates the proximity of the object 58 to the stitching by determining whether the object 58 is in the overlap area 25. In another example, the controller 26 evaluates the proximity of the object 58 to the stitching by determining whether the object 58 is outside the overlap area 25 but moving toward the overlap area 25. In still another example, the controller 26 evaluates the proximity of the object 58 to the stitching by determining whether the object 58 is in the overlap area 25 but moving away from the stitching.

Figure 6C:
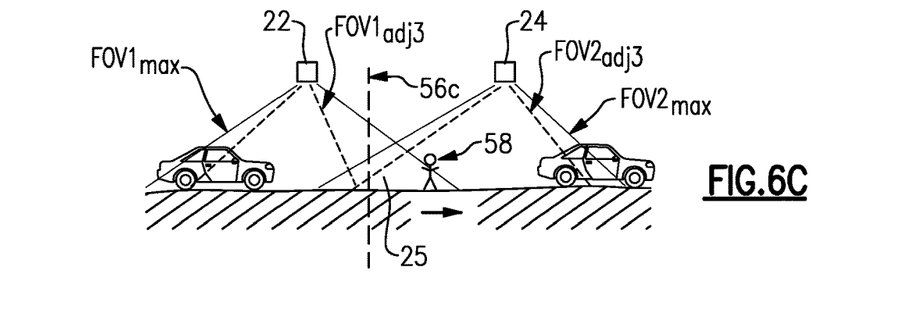

The first and seconds fields of view from the first and second cameras 22, 24 have maximum first and second fields of view $FOV1_{max}$, $FOV2_{max}$. Overlapping maximum fields of view are desirable so that the intersection 56 can be moved (e.g., 56*a*, 56*b*, 56*c*) as needed while still capturing the desired scene without gaps in the images. The stitching algorithm 30 determines which portion of the image from each of the first and second fields of view $FOV1_{max}$, $FOV2_{max}$ is used and creates an interface 56 in the overlap area 25 that ensures the object 58 is depicted on the display 18 regardless of its position in the scene.

The object 58 is illustrated as moving across the scene in FIGS. 6*a*-6*c*. The stitching algorithm 30 then crops the images to maintain the object 58 within view, with the resultant adjusted fields of view $FOV1_{adj1}$-$FOV1_{adj3}$, $FOV2_{adj1}$-$FOV2_{adj3}$ and the changing intersections 56*a*-56*c* illustrated. It should be understood, however, that the fields of view, intersections, and stitching interfaces may be determined in a manner other than illustrated in these figures.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

With continued reference to FIGS. 1-6C, FIG. 7 illustrates merging a first image 710 with a second image 720 to form a third image 730 presented to the vehicle operator. Each of the images is rectangular and includes an overlap region 702 that defines a portion of the image 710, 720 that overlaps with the other image 710, 720. The illustrated disparity in the overlap region 702 is exaggerated in the example for the purposes of explanation. In addition, in the example of FIG. 7, the first image 710 is a class IV image, and the second image 720 is a class V image, each having distinct dimensions and aspect ratios.

Figure 7:
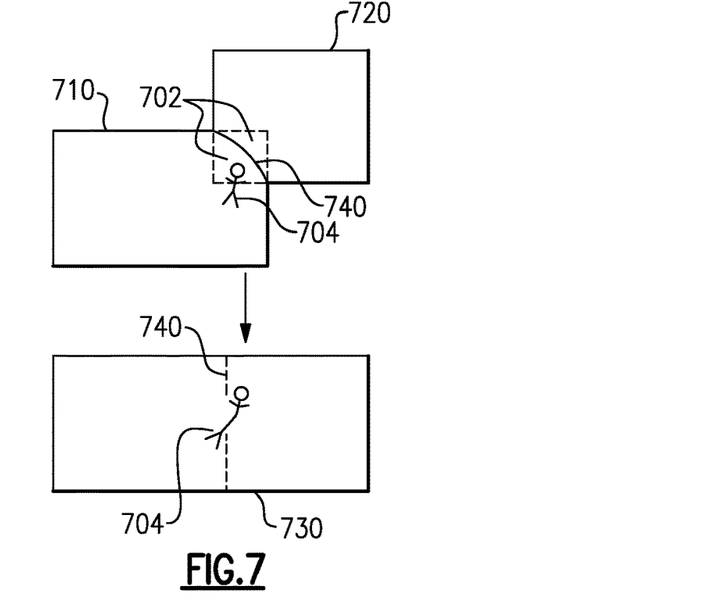
FIG. 7 illustrates an exemplary stitched view combining multiple fields of view.

A controller within the vehicle defines a stitching 740 joining the first image 710 and the second image 720. Each of the images are manipulated to create a single joined image as the third image 730 with the stitching 740 dividing the image. As can be appreciated, the manipulation of each image 710, 720 to create the joined third image 730 is different. As a consequence of the distinct manipulations an object 704 approaching, or crossing, the stitching 740 the appearance of the object is distorted. In the illustrated example, the object 704 is stretched and bent, however in other examples, portions of the object 704 can be cut, or obscured, or the object 704 can appear as two distinct objects 704 with a gap disposed between them.

Figure 8A:
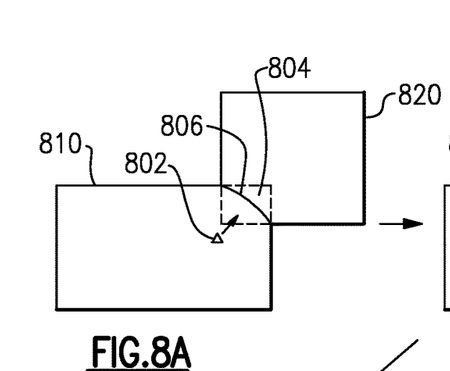
FIG. 8A illustrates a first portion of a dynamic stitching process for minimizing distortion of an object.
Figure 8B:
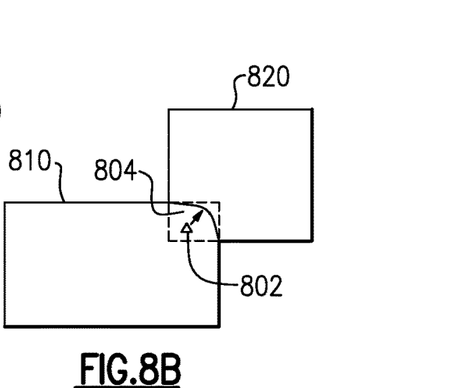
FIG. 8B illustrates a second portion of the dynamic stitching process for minimizing distortion of the object.

With continued reference to FIG. 7, FIGS. 8A-8D illustrate a process for minimizing the distortion of the object 704. Initially, in FIG. 8A, an object detection system detects an object 802 moving towards an overlap zone 804 of the first image 810 and the second image 820. As the object approaches the stitching line 806, the stitching line 806 dynamically shifts away from the object, allowing the object 802 to fully enter the overlap zone 804 without crossing the stitching line 806 as shown in FIG. 8B.

Figure 8C:
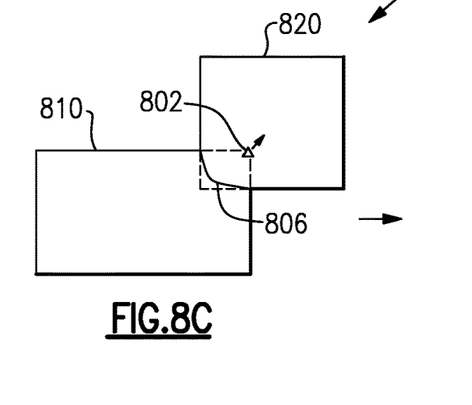
FIG. 8C illustrates a third portion of the dynamic stitching process for minimizing distortion of the object.
Figure 8D:
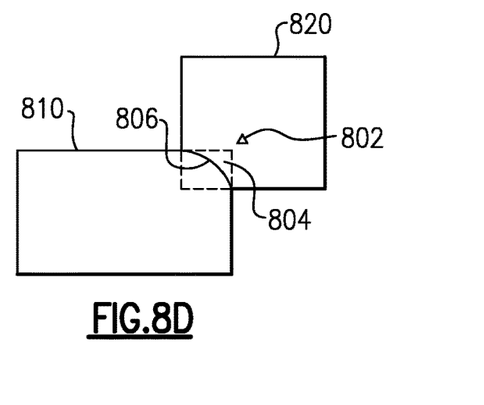
FIG. 8D illustrates a fourth portion of the dynamic stitching process for minimizing distortion of the object.

Once the object 806 has traveled sufficiently far into the overlap zone 804 that a new stitching line 806 can be created behind the object 802, without overlapping the object 802, the new stitching line 806 is created and replaces the old stitching line, effectively snapping the stitching line 806 behind the object 802 as shown in FIG. 8C. After snapping behind the object 802, the stitching line 806 begins following the object 802 until the stitching line 806 has returned to its original position, as shown in FIG. 8D.

By utilizing the dynamically moving stitching line 806 illustrated above, the object 802 never traverses a stitching line 806, and the distortions associated with approaching and crossing a stitching line 806 are minimized.

In some examples, multiple objects can simultaneously approach the stitching line 806 resulting in a situation where at least one detected object will cross the stitching line 806 and be distorted. In such an example, the controller 26 (see FIG. 1) implements a method for prioritizing which object should be subjected to minimal distortions.

In one example, the prioritization can be based on physical proximity to the vehicle or based on time to collision as determined by a collision avoidance system. In this example, the object determined to be closest to the vehicle, or soonest to collide with the vehicle and thus most likely to be a collision hazard, is prioritized for minimizing distortions.

In another example, where the object detection system of the vehicle controller 26 includes object classification, the prioritization can be based on object types. In such an example, the controller 26 consults an ordered listing of object classifications, and prioritizes the object having the highest position on the ordered list. In one example, an ordered list can be: 1) People, 2) Animals, 3) inanimate objects. In another example, objects can be classified as potential human objects and non-human objects, with potential human objects including people and objects likely to contain or include people and non-human objects being other types of objects.

In yet further examples, the methods for differentiating objects can be combined when multiple objects within the images have the same classification, or are the same distance from the vehicle.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A camera mirror system for a vehicle comprising:
a camera system having at least a first and second field of view of a scene, the first and second fields of view including a shared overlap area, the first field of view having a maximum field of view FOV1max and the second field of view having a maximum field of view FOV2max;
at least one display configured to display the first and second fields of view to provide a complete view of the scene comprising the first and second fields of view adjoining at a stitching interface corresponding to an intersection of the first and second fields of view in the overlap area, wherein the stitching interface is a position where the first and second fields of vi meet one another;
at least one object detector configured to detect an object in the scene; and
a controller in communication with the camera system, the at least one object detector, and the at least one display, wherein the controller includes a stitching module having a stitching algorithm, the stitching algorithm defining the stitching interface within the shared overlap area by determining which sections of the shared portion in FOV1max and the shared portion in FOV2max to crop, cropping at least one of the first and second fields of view within the shared portion such that the object is depicted on the display, the controller including a control module configured to evaluate the proximity of the object to the stitching interface defied by the stitching algorithm and adjust the cropping of the at least one of the first and second fields of view such that the object is continuously depicted on the display regardless of its position in the scene and wherein the object is continuously depicted by dynamically adjusting the stitching interface such that the object does not cross the stitching interface, wherein dynamically adjusting the stitching interface comprises shifting the stitching interface away from an approach path of the object in response to the object entering the overlap area and snapping the stitching interface behind the object after the object has traveled sufficiently far into the overlap area that a new stitching line can be created behind the object.

2. The camera mirror system of claim 1, wherein the object detector includes one of an image based detection system and a 3D space detection system.

3. The camera mirror system of claim 1, wherein the first and second fields of view correspond to distinct class views.

4. The camera mirror system of claim 1, wherein first and second fields of view each have a maximum field of view that provides the overlap area, and the controller is configured to reduce at least of the first and second fields of view from its maximum field of view to provide the stitching interface.

5. The camera mirror system of claim 1, wherein at least one of the first and second field of view is distorted at the stitching interface.

6. The camera mirror system of claim 1, wherein the controller evaluates the proximity of the object to the stitching interface by at least one of determining whether the object is approaching the overlap area, the object is in the overlap area, and/or the object is exiting the overlap area.

7. The camera mirror system of claim 1, wherein the controller is configured to determine whether the object is human, and wherein the stitching algorithm is configured to give priority to a first classification of objects over a second classification of objects.

8. The camera mirror system of claim 7, wherein the first classification of objects is human objects, the second classification of objects is non-human objects, and wherein the classification of human objects includes humans and objects likely to include humans.

9. The camera mirror system of claim 7, wherein the first classification of objects is a nearest object to vehicle classification.

10. The camera mirror system of claim 1, wherein the at least one object detector is a 3D space object detector including at least one of the camera system, a radar sensor, a LIDAR sensor, an infrared sensor, and/or an ultrasonic sensor.

11. The camera mirror system of claim 1, wherein the at least one object detector is an image detection system configured to detect an object using a neural network detection.

12. The camera mirror system of claim 1, wherein the camera system includes at least a third field of view of the scene, wherein the third field of view includes a corresponding overlap area with at least one of the first field of view and the second field of view and wherein the stitching algorithm is configured to evaluate the proximity of the object to the corresponding overlap area and adjust at least one of the third field of view and the at least one of the first and second field of view and ensure that the object is depicted on the at least one display.

13. A method of displaying multiple vehicle camera views, comprising the steps of:
sensing first and second images respectively in first and second fields of view of a scene, the first field of view having a maximum field of view FOV1max and the second field of view having a maximum field of view FOV2max, FOV1max and FOV2max including an overlap area with one another, and stitching the first and second images using stitching algorithm configured to create a stitching interface, the stitched first and second images creating a third image, wherein the stitching interface is a position where at least one of the first and second fields of view to meet one another, the stitching algorithm defining the stitching interface within the shared overlap area by determining which sections of the shared portion in FOV1max and the shared portion in FOV2max to crop and cropping the determined regions such that an object is depicted on the display;
detecting a proximity of the object in the scene to the stitching interface;
dynamically adjusting the stitching interface using a control module such that the object does not cross the stitching interface by shifting the stitching interface away from an approach path of the object in response to the object entering the overlap area and snapping the stitching interface behind the object after the object has traveled sufficiently far into the overlap area that a new stitching line can be created behind the object; and
displaying the third image.

14. The method of claim 13, wherein the sensing step is performed using first and second cameras respectively providing the first and second fields of view each having a maximum field of view that provides the overlap area.

15. The method of claim 14, wherein the dynamically adjusting step includes using less than the maximum field of view of at least one of the first and second cameras for display.

16. The method of claim 13, wherein the dynamically adjusting step further comprises the stitching interface following the object after snapping behind the object.

17. The method of claim 13, wherein the detecting step includes sensing the object using at least one of a camera including at least one of first and second camera respectively providing the first and second fields of view, a radar sensor, a LIDAR sensor, an infrared sensor, and/or an ultrasonic sensor.

18. The method of claim 17, wherein the detecting step includes evaluating the proximity of the object to the overlap area by determining whether the object is approaching the overlap area, in the overlap area, or exiting the overlap area.

19. The method of claim 13, wherein the detecting step includes determining a classification of the object, and the adjusting step includes prioritizing objects having a first classification over objects not having the first classification when dynamically adjusting the stitching interface.

20. The method of claim 13, wherein the detecting step includes detecting at least one of a proximity to the vehicle and a time to collision with the vehicle and the adjusting step includes prioritizing a closest object to the vehicle when dynamically adjusting the stitching interface.

* * * * *